3,284,476
3-UNSUBSTITUTED, 16-METHYLENE PREGNENES AND PREGNADIENES
Fred A. Kincl, Stockholm, Sweden, assignor to Syntex Corporation, Panama, Panama, a corporation of Panama
No Drawing. Filed Oct. 22, 1965, Ser. No. 502,274
21 Claims. (Cl. 260—397.4)

This invention relates to novel cyclopentanopolyhydrophenanthrene derivatives and to processes for the preparation thereof.

More particularly, this invention relates to novel 3-desoxy-16-methylenepregnenes and 3-desoxy-16-methylenepregnadienes represented by the general formula:

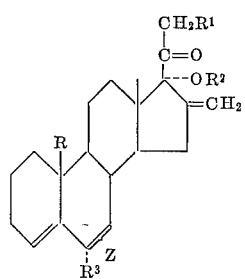

In the above formula R represents hydrogen or methyl, R' represents hydrogen or a halogen having an atomic number less than 35, i.e., fluorine or chlorine, $R^2$ represents hydrogen or an acyl group, $R^3$ represents hydrogen, methyl, fluorine or chlorine, and Z represents either a double bond or a saturated linkage between C–6 and C–7.

The acyloxy and acyl groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 3-desoxy-16-methylenepregnenes and -pregnadienes represented by the above formula are progestational agents having anti-estrogenic, anti-androgenic and anti-ovulatory properties, and thus are useful in fertility control in humans and animals.

The novel compounds of the present invention are prepared by the process illustrated by the following equation:

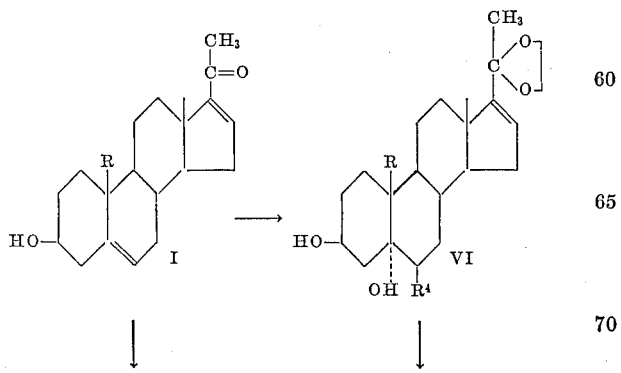

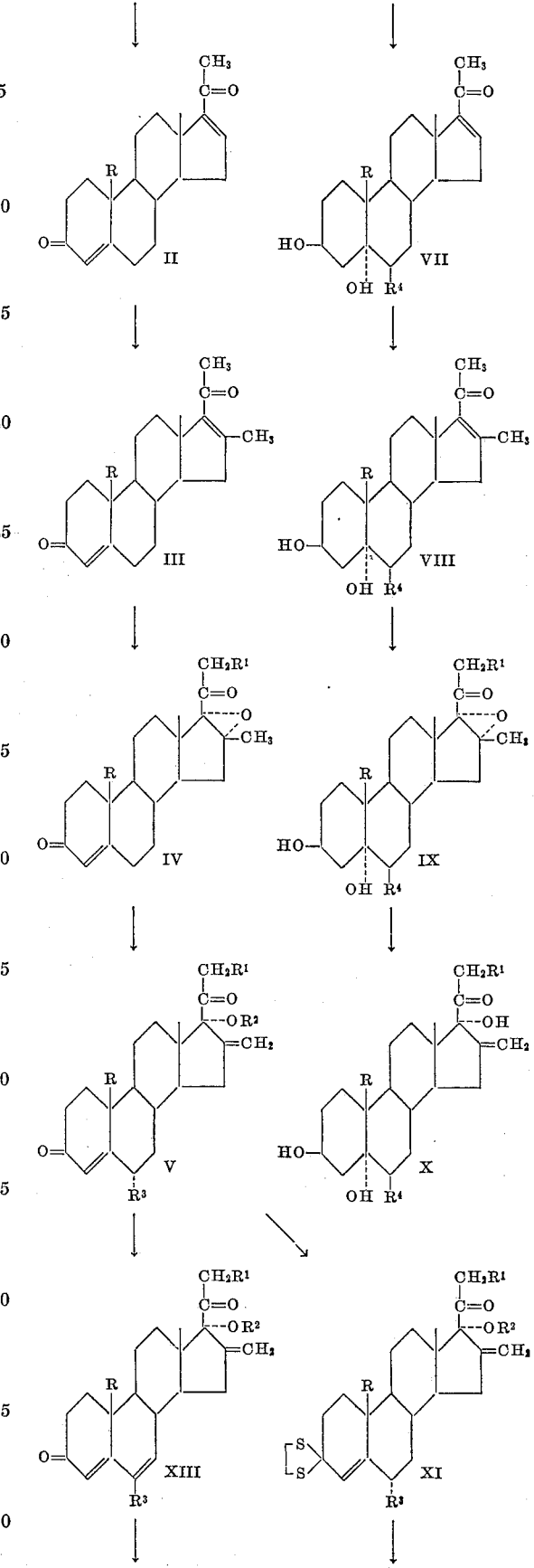

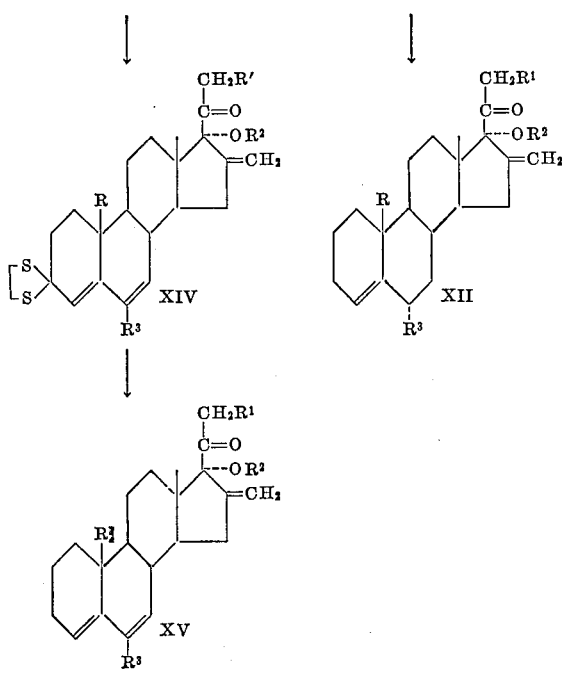

In the above formulas R, R′, R², and R³ have the same meanings as set forth previously and R⁴ represents methyl, fluorine or chlorine.

Where 6-unsubstituted final products are desired, the starting material I, i.e., $\Delta^{5,16}$-pregnadien-3β-ol-20-one (I; R=methyl) or 19-nor-$\Delta^{5,16}$-pregnadien-3β-ol-20-one (I; R=hydrogen; obtained as descried in my copending U.S. patent application Serial No. 331,122, filed Dec. 17, 1963), is subjected to Oppenauer oxidation, i.e., using aluminum isopropoxide in a mixture of toluene and cyclohexanone, to give the corresponding $\Delta^{4,16}$-3,20-dione, e.g., $\Delta^{4,16}$-pregnadiene-3,20-dione (II; R=methyl). The latter compound, dissolved in a solution of diazomethane in diethyl ether, is allowed to stand at room temperature for about 24 hours, followed by heating the solution at a temperature of about 180° C. or higher to decompose the initially formed 16,17-pyrazoline, thus giving the corresponding 16-methyl-$\Delta^{4,16}$-3,20-dione, that is, 16-methyl-$\Delta^{4,16}$-pregnadiene-3,20 - dione (III; R=methyl). The 16(17)-double bond is then selectively epoxidized to give the corresponding 16β-methyl-16α,17α-oxido steroid. This can be accomplished by any of a number of methods known to the art. For example, hydrogen peroxide can be admixed with a solution of the 16-methyl-$\Delta^{4,16}$-3,20-dione in an inert organic solvent, e.g., a lower alkonal, such as methanol or ethanol, an aromatic hydrocarbon such as benzene, toluene, or xylene, a chlorinated hydrocarbon such as methylene dichloride, chloroform or carbon tetrachloride, and the like, as well as mixture thereof, under alkaline conditions, e.g., in the presence of sodium hydroxide, at low temperature, e.g., about 15° C. or lower, and the resulting reaction mixture can then be allowed to stand at room temperature or lower, e.g., at 0° C., overnight, to give the 16α,17α-oxido intermediate.

Fluorine or chlorine can be introduced at the 21-position immediately following this expoxidation reaction, or after the 16α,17α-oxido ring has been cleaved to form the corresponding 16-methylene-17α-hydroxy or -acyloxy compound, or after a double bond has been introduced at the 6(7)-position in said 16-methylene-17α-hydroxy or -acyloxy compound, or after the 3-keto group has been removed. In any event, the halogen atom can be introduced by any of a number of methods known to the art.

Thus, for example, 16β-methyl-16α,17α-oxido-$\Delta^4$-pregnene-3,20-dione, can be dissolved in an inert organic solvent, such as tetrahydrofuran or the like, and then reacted with iodine in the presence of calcium oxide and methanol at room temperature to give the corresponding 21-iodo intermediate, e.g., 21-iodo-16β-methyl-16α,17α-oxido-$\Delta^4$-pregnene 3,20-dione (IV: R=methyl, R′=iodine). This 21-iodo intermediate can then be converted to the corresponding 21-fluoro compound, e.g., 21-fluoro-16β-methyl-16α,17α - oxido-$\Delta^4$-pregnene-3,20-dione (IV: R=methyl, R′=fluorine), by reacting it at room temperature or below with silver fluoride in aqueous acetonitrile solution.

Similarly, the 21-iodo intermediate can be converted to the corresponding 21-chloro compound, e.g., 21-chloro-16β - methyl - 16α,17α-oxido-$\Delta^4$-pregnene-3,20-dione (IV: R=methyl, R′=chlorine), by dissolving it in an inert organic solvent, e.g., dimethyl formamide or the like, and then refluxing it for about 1 to 2 hours with lithium chloride.

The 16α,17-oxido moiety is cleaved to provide either the corresponding 16-methylene-17α-hydroxy compound (V: R=methyl, R′, R² and R³=hydrogen) or a 17-acylate thereof (V: R=methyl, R′ and R³=hydrogen, R²=acyl).

Whether a free 17α-hydroxy compound or a 17α-acyloxy compound is desired, the cleaving reaction will take place in an inert organic solvent of low ionizing power, e.g., an aromatic hydrocarbon such as benzene, toluene or xylene, and ether such as diethyl ether, diisopropyl ether, dioxane or tetrahydrofuran, and the like, as well as mixtures thereof, in which the acid used is not freely ionized. This favors the formation of a high proportion of the 16-methylene compound.

To obtain the free 17α-hydroxy compound, the cleaving reaction will be carried out at a temperature of from about 15° C. to about 30° C., and preferably at room temperature, using either a strong mineral acid, such as hydrochloric, hydrobromic, sulfuric or perchloric acid, or the like, or a strong carboxylic acid, such as formic, monochloroacetic, trifluoroacetic, or the like. Thus, for example, the oxido group in 16β-methyl-16α,17α-oxido-$\Delta^4$-pregnene-3,20-dione can be cleaved to give 16-methylene-$\Delta^4$-pregnen-17α-ol-3,20-dione (V: R=methyl, R′, R² and R³=hydrogen), which can then be converted to the corresponding 21-fluoro or -chloro derivative. Alternatively, 21-fluoro (or -chloro)-16β-methyl-16α,17α-oxido-$\Delta^4$-pregnene-3,20-dione (IV: R=methyl,, R′=fluorine or chlorine) can be similarly reacted to cleave the oxido group to give 21-fluoro (or chloro)-16-methylene-$\Delta^4$-pregnen-17α-ol-3,20-dione (V: R=methyl, R′=fluorine or chlorine, R² and R³=hydrogen).

The corresponding 17α-acyloxy compound can be obtained by carrying out the cleaving reaction at a temperature of from about 20° C. to about 100° C. using an acid anhydride, preferably an anhydride of a hydrocarbon carboxylic acid containing less than 12 carbon atoms as described hereinabove, in the presence of an acid catalyst, e.g., p-toluenesulfonic acid or the like, followed by acid hydrolysis to selectively remove the 3-enol acylate grouping and regenerate the $\Delta^4$-3-keto system. Thus, for example, by reacting 16β - methyl-16α,17α-oxido-$\Delta^4$-pregnene-3,20-dione with acetic anhydride in the presence of p-toluenesulfonic acid at about 100° C. and then reacting at low temperature, e.g., 0–5° C., with methanolic potassium hydroxide or the like in dioxane, tetrahydrofuran or the like, 16-methylene-$\Delta^4$-pregnen-17α-ol-3,20-dione 17 - acetate (V: R=methyl, R′ and R³=hydrogen, R²=acetyl) is obtained, and can then be converted to the corresponding 21-fluoro or -chloro derivative, while 21-fluoro- (or -chloro)-16β-methyl-16α,17α- oxido-$\Delta^4$-pregnene-3,20-dione (IV: R=methyl, R¹=fluorine or chlorine), by the same treatment, gives 21-fluoro (or -chloro)-16-methylene-$\Delta^4$-pregnen-17α-ol-3,20-dione 17-acetate (V: R=methyl, R′=fluoro or chloro, R²=acetyl, R³=hydrogen).

It is preferred that the cleaving reaction be carried out so as to give the 17-ester, which, after the 3-keto group has been removed to give the 3-desoxy-$\Delta^4$ or -$\Delta^{4,6}$-final product, can then be hydrolyzed to the corresponding free 17α-ol, if desired, by boiling with a 1–5% aqueous methanolic solution of sodium hydroxide or potassium hydroxide for from about 2 to 24 hours under an inert nitrogen atmosphere.

The 17-acylates can also be prepared either directly after cleaving the 16α,17α-oxido group to give a free 17α-hydroxy compound, after the introduction of a 6(7)-double bond, or after the removal of the 3-keto group, from the corresponding 17α-hydroxy compounds by direct acylation, e.g., by using a mixture of a hydrocarbon carboxylic acid of the type described hereinabove and the corresponding anhydride, such as a mixture of acetic acid and acetic anhydride, in the presence of an acid catalyst such as p-toluenesulfonic acid or the like. This gives the $\Delta^{3,5}$-3,17-diacylate, from which the enol acylate group can be removed and the $\Delta^4$-3-keto system regenerated in the manner described hereinabove.

As previously indicated, when introducing fluorine or chlorine at the 21-position at any point after the 16α,17α-oxido ring has been cleaved, the same procedures as those described hereinabove for fluorinating or chlorinating the 21-carbon atom in the 16α,17α-oxido intermediate can be used. However, a fluorine or chlorine atom can also be introduced at the 21-position in a 16-methylene-$\Delta^4$-pregnen-17α-ol-3,20-dione by first preparing the corresponding 21-iodo derivative, e.g., by reaction with iodine at room temperature in the presence of calcium oxide and methanol, then refluxing this 21-iodo intermediate with freshly fused potassium acetate in acetone for about 8 hours or longer to form the corresponding 21-acetoxy derivative, next saponifying this 21-acetate by conventional means, e.g., by refluxing with aqueous methanolic sodium hydroxide, potassium hydroxide, potassium carbonate, or the like, to give the corresponding free 21-hydroxy compound, then forming the corresponding 21-mesylate by reacting the free 21-hydroxy compound for about 24 hours or longer with mesyl chloride in pyridine, and finally refluxing the thus-obtained 21-mesylate with silver fluoride in aqueous acetonitrile for from about 15 minutes to about 24 hours to give the 21-fluoro compound, or with lithium chloride in dimethylformamide for from about 1 to about 2 hours to give the corresponding 21-chloro compound.

Where 6-substituted final products are desired, the 5(6)-double bond in the starting material I is selectively epoxidized in known manner, e.g., using a peracid such as monoperphthalic acid, perbenzoic acid, or the like, preferably in excess, in an inert organic solvent, e.g., a chlorinated hydrocarbon such as methylene dichloride, chloroform or carbon tetrachloride, an ether such as diethyl ether, diisopropyl ether, or the like, as well as mixtures thereof, and preferably a mixture of chloroform and diethyl ether, at room temperature for from about 1 to about 60 hours to give the corresponding 5α,6α-epoxide, i.e. 5α,6α-oxido-$\Delta^{16}$-pregnen-3β-ol-20-one.

The 20-keto group is then ketalized in known manner, e.g., using a lower alkylene glycol such as ethylene glycol, propylene glycol, or the like, in the presence of a small amount of an acid catalyst such as p-toluenesulfonic acid or the like, thus giving the corresponding 20-ketal, e.g., 20-cycloethylenedioxy-5α,6α-oxido-$\Delta^{16}$-pregnen-3β-ol.

Alternatively, the starting material I can first be ketalized, thus giving, for example, 20-cycloethylenedioxy-$\Delta^{5,16}$-pregnadien-3β-ol, and this 20-ketal can then be epoxidized to give the corresponding 5α,6α-oxido steroid, e.g., 20-cycloethylenedioxy-5α,6α-oxido-$\Delta^{16}$-pregnen-3β-ol, each of these reactions being carried out in the manner described hereinabove.

In preparing 6-methyl compounds, the thus-obtained 5α,6α-oxido-20-ketal intermediate is refluxed with methylmagnesium bromide in tetrahydrofuran, thus giving the corresponding 5α-hydroxy-6β-methyl intermediate, e.g., 20-cycloethylenedioxy-6β-methyl-$\Delta^{16}$-pregnene-3β,5α-diol (VI: R and $R^4$=methyl).

In preparing 6-fluoro or -chloro compounds, the 5α,6α-oxido-20-ketal intermediate is reacted with boron trifluoride in a mixture of diethyl ether and benzene, or with anhydrous hydrogen chloride in chloroform, to give the corresponding 5α-hydroxy-6β-fluoro or -chloro intermediate, e.g., 20-cycloethylenedioxy-6β-fluoro (or -chloro)-$\Delta^{16}$-pregnene-3β,5α-diol (VI: R=methyl, $R^4$=fluorine or chlorine).

The thus-obtained 5α-hydroxy-6β-substituted intermediate is then hydrolyzed in known manner, e.g., using a strong acid such as 8% sulfuric acid in methanol, concentrated hydrochloric acid in acetone, or the like, thus giving the corresponding free 20-keto steroid, e.g., 6β-methyl (-fluoro or -chloro)-$\Delta^{16}$-pregnene,3β,5α-diol-20-one (VII: R=methyl, $R^4$=methyl, fluorine or chlorine).

The 16-methyl group is then introduced by reacting the 5α-hydroxy-6β-substituted-20-one with diazomethane in diethyl ether in the manner described hereinabove to give the corresponding 16-methyl-6β-substituted-$\Delta^{16}$-steroid, i.e., 6β,16-dimethyl-$\Delta^{16}$-pregnene-3β,5α-diol-20-one (VIII: R and $R^4$=methyl).

Epoxidation of the 16(17)-double bond in this 6β-substituted-16-methyl-$\Delta^{16}$-steroid, using alkaline hydrogen peroxide in the manner described hereinabove, gives the corresponding 6β-substituted-16β-methyl-16α,17α-oxido steroid, e.g., 6β,16β-dimethyl-16α,17α-oxidopregnane-3β,5α-diol-20-one (IX: R and $R^4$=methyl, R'=hydrogen).

Fluorine or chlorine can be introduced at the 21-position immediately following this epoxidation reaction, or after the 16α,17α-oxido ring has been cleaved to form the corresponding 16-methylene-6β-substituted-17α-hydroxy compound, or after the $\Delta^4$-3-keto system or a 6(7)-double bond has been introduced, or after the 3-keto group has been removed, and in all cases, the procedures described hereinabove can be used to accomplish this.

The epoxy group in the 6β-substituted-16α,17α-oxido steroid is cleaved with a strong mineral or organic acid in the manner described hereinabove to give the corresponding 16-methylene-6β-substituted-17α-hydroxy compound, e.g., 16-methylene-6β-methylpregnane-3β,5α,17α-triol-20-one (X: R and $R^4$=methyl, R'=hydrogen).

By oxidizing the thus-obtained 16-methylene-6β-substituted-17α-hydroxy compound with 8 N chromic acid in acetone solution, the corresponding 16-methylene-6α-substituted-$\Delta^4$-3-one, e.g., 16-methylene-6α-methyl-$\Delta^4$-pregnen-17α-ol-3,20-dione (V: R and $R^3$=methyl, R' and $R^2$=hydrogen).

The corresponding 17-acylates can be prepared by direct acylation in the manner described hereinabove, followed by selective hydrolysis to remove the 3-acyl group and regenerate the $\Delta^4$-3-keto system, and the acylation reaction can also be carried out after the introduction of a 6(7)-double bond or the removal of the 3-keto group. Thus, for example, acylation of 16-methylene-6α-methyl-$\Delta^4$-pregnen-17α-ol-3,20-dione with a mixture of acetic anhydride and acetic acid in the presence of p-toluenesulfonic acid, followed by selective hydrolysis with methanolic potassium hydroxide, gives the corresponding 17-acetate (V; R and $R^3$=methyl, R'=hydrogen, $R^2$=acetyl).

In the next step of the process as outlined hereinabove, the 16-methylene-6α-substituted or -unsubstituted-17α-hydroxy or -acyloxy-$\Delta^4$-3-one V, and preferably a 17-acylate, e.g., 16-methylene-$\Delta^4$-pregnen-17α-ol-3,20-dione 17-acetate, is converted to the corresponding 3-dithioketal, i.e., 3-cycloethylenedithio-16-methylene-$\Delta^5$-pregnen-17α-ol-20-one 17-acetate (XI; R=methyl, R' and $R^3$=hydrogen, $R^2$=acetyl), by reacting it with ethanedithiol in glacial acetic acid at room temperature for from about 30 minutes to about 30 hours.

Next, the resulting 3-dithioketal, dissolved in a lower alkanol such as methanol, ethanol, or the like, is reacted with Raney nickel at a temperature of from about 15° C. to about 120° C. for from about 1 to about 30 hours, thus giving the corresponding 3-desoxy-16-methylene-Δ⁴-pregnene, e.g., 16 - methylene-Δ⁴-pregnen-17α-ol-20-one 17-acetate (XII; R=methyl, R' and R³=hydrogen, R²=acetyl).

The corresponding 3-desoxy-16-methylene-Δ⁴,⁶-pregnadienes can be prepared by first reacting the 16-methylene-17α-hydroxy or -acyloxy steroid (V) with chloranil in t-butanol, thus giving the corresponding 6-dehydro derivative, e.g., 16-methylene-Δ⁴,⁶-pregnadien-17α-ol-3,20-dione 17-acetate (XIII; R=methyl, R' and R³=hydrogen, R²=acetyl).

This Δ⁴,⁶-diene is then reacted with ethanedithiol in the manner described hereinabove to give the corresponding 3-dithioketal, e.g., 3 - cycloethylenedithio-16-methylene-Δ⁴,⁶-pregnadien-17α-ol-20-one 17-acetate (XIV; R=methyl, R' and R³=hydrogen, R²=acetyl), which is then reacted with Raney nickel in the manner described hereinabove to give the corresponding 3-desoxy-16-methylene-Δ⁴,⁶-pregnadiene, e.g., 16-methylene-Δ⁴,⁶-pregnadien-17α-ol-20-one 17-acetate (XV; R=methyl, R' and R³=hydrogen, R²=acetyl).

The 3-desoxy-16-methylene-Δ⁴,⁶-pregnadienes having a 6-fluoro or -chloro substituent can also be prepared by a process which can be illustrated schematically as follows:

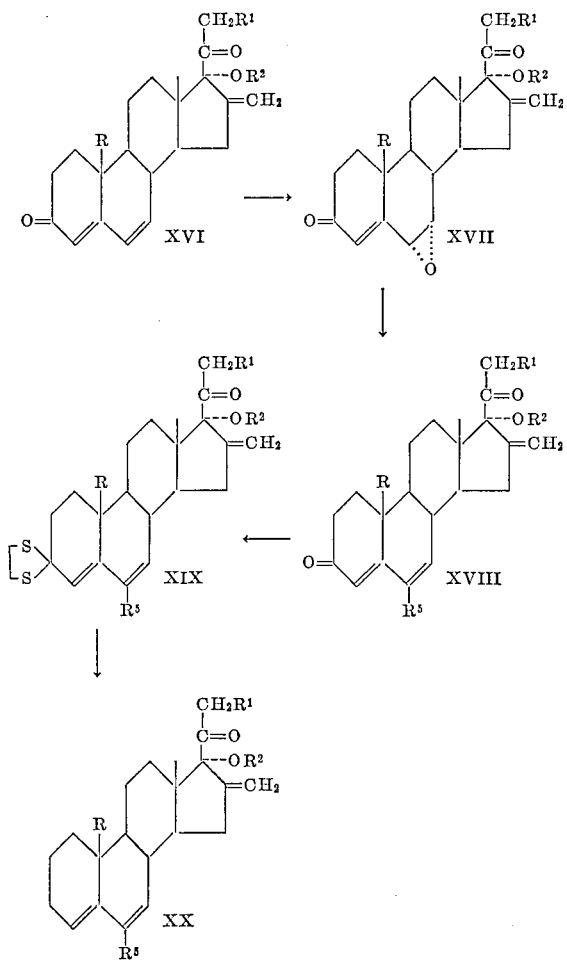

In these formulas R, R' and R² have the same meanings as set forth previously, and R⁵ represents fluorine or chlorine.

In carrying out this process a 6-unsubstituted-6-dehydro steroid, e.g., 16 - methylene-Δ⁴,⁶-pregnadien-17α-ol-3,20-dione 17-acetate (XVI; R=methyl, R'=hydrogen, R²= acetyl) is reacted with a peracid in the manner described hereinabove for the preparation of the 5α,6α-oxido intermediate to give the corresponding 6α,7α-oxido intermediate, e.g., 6α,7α - oxido-16-methylene-Δ⁴-pregnen-17α-ol-3,20-dione 17-acetate (XVII; R=methyl, R'=hydrogen, R²=acetyl).

A 6-fluoro substituent is introduced by reacting the thus-obtained 6α,7α-oxido steroid with boron trifluoride in a mixture of diethyl ether and benzene, preferably at room temperature overnight, to form the corresponding 6β-fluoro-7α-hydroxy intermediate, which can then be dehydrated to remove the 7α-hydroxy group and reintroduce a 6(7)-double bond by suspending it in glacial acetic acid and passing a current of hydrogen chloride gas through the suspension at room temperature or below, e.g., at from about 15° C. to about 25° C., for from about 2 to 6 hours, thus giving the corresponding 6-fluoro-6-dehydro steroid, e.g., 6-fluoro-16-methylene-Δ⁴,⁶-pregnadien-17α-ol-3,20-dione 17-acetate (XVIII; R=methyl, R'=hydrogen, R²=acetyl, R⁵=fluoro).

A 6-chloro substituent can be introduced by treating the 6α,7α-oxido intermediate with anhydrous hydrogen chloride in an inert solvent such as acetic acid at a temperature from about 15° C. to 25° C. for a period of time from 3 to 12 hours to produce the corresponding 6-chloro-6-dehydro compound.

The resulting 6-fluoro or -chloro-6-dehydro steroid is then converted to the 3-dithioketal (XIX) in the manner described above, following which treatment with Raney nickel in the manner described hereinabove gives the 3-desoxy-6-fluoro or -chloro-16 - methylene-Δ⁴,⁶-pregnadiene (XX).

In order that those skilled in the art can more fully understand the present invention, the following examples are set forth. These examples are given solely for the purpose of illustrating the invention, and should not be considered as expressing limitations unless so set forth in the appended claims.

EXAMPLE I

One gram of Δ⁵,¹⁶-pregnadien-3β-ol-20-one was dissolved in a mixture of 30 cc. of commercial grade xylene and 10 cc. of cyclohexanone, and 10 cc. of this solvent mixture were then distilled off to remove moisture. Next, a solution of 1 gram of aluminum isopropoxide in 5 cc. of anhydrous xylene was added dropwise, over a 5 minute period, to the slowly distilling solution, and distillation was then continued following this addition for 45 minutes. The solvent mixture was then removed by steam distillation, and the resulting solid was collected by filtration on Celite, washed with water and dried. Extraction of the dry solid with hot acetone, followed by recrystallization from acetone, gave Δ⁴,¹⁶-pregnadiene-3,20-dione.

By repeating this procedure in every detail but one, namely, replacing Δ⁵,¹⁶-pregnadien-3β-ol-20-one with 19-nor-Δ⁵,¹⁶-pregnadien-3β-ol-20-one as the steroid starting material, 19-nor-Δ⁴,¹⁶-pregnadiene - 3,20-dione was obtained.

EXAMPLE II

One gram of Δ⁴,¹⁶-pregnadiene-3,20-dione was dissolved in 30 cc. of a 1 N solution of diazomethane in diethyl ether, and the resulting reaction mixture was then allowed to stand at room temperature for 24 hours. Following this reaction period 5 cc. of acetic acid were added to destroy excess diazomethane, and the solvent was then evaporated under reduced pressure to give the dry, crude 16α,17α-pyrazoline, which was then decomposed by heating it gradually to 180° C. under vacuum. Recrystallization of the resulting solid product from acetone/hexane gave 16-methyl-Δ⁴,¹⁶-pregnadiene-3,20-dione.

By repeating this procedure using 19-nor-Δ⁴,¹⁶-pregnadiene-3,20-dione as the steroid starting material, 16-methyl-19-nor-Δ⁴,¹⁶-pregnadiene-3,20-dione was obtained.

EXAMPLE III

A solution of 5 grams of 16-methyl-$\Delta^{4,16}$-pregnadiene-3,20-dione in 150 cc. of methanol was cooled to 15° C. Next, 20 cc. of an aqueous 4 N solution of sodium hydroxide and 20 cc. of 30% hydrogen peroxide were added, with stirring, the temperature being maintained at 15° C. during this addition. The resulting reaction mixture was allowed to stand at 0° C. overnight, then poured into ice water. The resulting precipitate was collected by filtration, washed with water until neutral and dried. Recrystallization from acetone/hexane gave 16$\beta$-methyl-16$\alpha$,17$\alpha$-oxido-$\Delta^4$-pregnene-3,20-dione.

By repeating this procedure using 16-methyl-19-nor-$\Delta^{4,16}$-pregnadiene-3,20-dione as the steroid starting material, 16$\beta$-methyl - 19-nor-16$\alpha$,17$\alpha$ - oxido-$\Delta^4$-pregnene-3,20-dione was obtained.

EXAMPLE IV

A cooled, continuously stirred solution of 5 grams of 16$\beta$ - methyl - 16$\alpha$,17$\alpha$ - oxido - $\Delta^4$ - pregnene - 3,20-dione in a mixture of 30 cc. of tetrahydrofuran and 18 cc. of methanol was treated first with 6 grams of calcium oxide, added in small portions, and then with 6 grams of iodine. The resulting reaction mixture was then stirred at room temperature until it turned pale yellow. At this point the reaction mixture was poured into ice water containing 18 cc. of acetic acid and 2 grams of sodium thiosulfate and, after stirring for 15 minutes, the solution was decanted and the precipitate collected by filtration, washed with water and dried under reduced pressure, thus giving 21 - iodo - 16$\beta$ - methyl - 16$\alpha$,17$\alpha$-oxido-$\Delta^4$-pregnene-3,20 dione.

This 21-iodo intermediate was then dissolved in 20 cc. of acetonitrile. To this solution there was added dropwise 1.4 grams of silver fluoride dissolved in 3 cc. of water. After a short time, silver iodide began to precipitate, leaving the desired 21-fluoro steroid in solution. The reaction mixture was allowed to stand for 24 hours at room temperature, then filtered. Concentration of the filtrate under reduced pressure gave a crude product which, after crystallization from acetone/methanol, gave 21-fluoro-16$\beta$-methyl-16$\alpha$,17$\alpha$-oxido-$\Delta^4$-pregnene-3,20-dione.

By repeating this procedure using 16$\beta$ - methyl - 19-nor - 16$\alpha$,17$\alpha$ - oxido - $\Delta^4$ - pregnene - 3,20 - dione as the steroid starting material, the corresponding 21-iodo intermediate, followed by 21 - fluoro - 16$\beta$ - methyl - 19-nor-16$\alpha$,17$\alpha$-oxido-$\Delta^4$-pregnene-3,20-dione, was obtained.

EXAMPLE V

A suspension of 10 grams of lithium chloride in 50 cc. of dimethylformamide was heated to boiling. Next, a solution of 2 grams of 21 - iodo - 16$\beta$ - methyl - 16$\alpha$,17$\alpha$-oxido - $\Delta^4$ - pregnene - 3,20 - dione in 10 cc. of dimethylformamide was added, and the resulting reaction mixture was refluxed for 2 hours. Following this reaction period the reaction mixture was cooled and poured into water, and the thus-formed precipitate was filtered off and crystallized from acetone/hexane to give 21 - chloro - 16$\beta$-methyl-16$\alpha$,17$\alpha$-oxido-$\Delta^4$-pregnene-3,20-dione.

By repeating this procedure using 21 - iodo - 16$\beta$-methyl - 19 - nor - 16$\alpha$,17$\alpha$ - oxido - $\Delta^4$ - pregnene - 3,20-dione as the steroid starting material, 21-chloro-16$\beta$-methyl - 19 - nor - 16$\alpha$,17$\alpha$ - oxido - $\Delta^4$ - pregnene - 3,20-dione was obtained.

EXAMPLE VI

A mixture of 1.2 grams of 16$\beta$ - methyl - 16$\alpha$,17$\alpha$-oxido - $\Delta^4$ - pregnene - 3,20 - dione, 15 ml. of trifluoroacetic acid and 10 ml. of benzene was allowed to stand at room temperature for 2 hours. Following this reaction period water was added to the reaction mixture, and the resulting solution was extracted with methylene dichloride. The organic extract was washed with an aqueous 5% potassium bicarbonate solution, then with a saturated sodium chloride solution, and then dried over anhydrous magnesium sulfate. Crystallization from acetone/diethyl ether gave 16 - methylene - $\Delta^4$ - pregnen-17$\alpha$-ol-3,20-dione.

This procedure was then repeated using 21-fluoro-16$\beta$-methyl - 16$\alpha$,17$\alpha$ - oxido - $\Delta^4$ - pregnene - 3,20 - dione, 21 - chloro - 16$\beta$ - methyl - 16$\alpha$,17$\alpha$ - oxido - $\Delta^4$ - pregnene - 3,20 - dione, 16$\beta$ - methyl - 19 - nor - 16$\alpha$,17$\alpha$-oxido - $\Delta^4$ - pregnene - 3,20 - dione, 21 - fluoro - 16$\beta$-methyl - 19 - nor - 16$\alpha$,17$\alpha$ - oxido - $\Delta^4$ - pregnene - 3,20-dione, and 21 - chloro - 16$\beta$ - methyl - 19 - nor - 16$\alpha$,17$\alpha$-oxido - $\Delta^4$ - pregnene - 3,20 - dione, respectively, as the steroid starting material. In each case, the corresponding 16 - methylene steroid, namely, 21 - fluoro - 16 - methylene - $\Delta^4$ - pregnen - 17$\alpha$ - ol - 3,20 - dione, 21 - chloro-16 - methylene - $\Delta^4$ - pregnen - 17$\alpha$ - ol - 3,20 - dione, 16 methylene - 19 - nor - $\Delta^4$ - pregnen - 17$\alpha$ - ol - 3,20-dione, 21 - fluoro - 16 - methylene - 19 - nor - $\Delta^4$ - pregnen - 17$\alpha$ - ol - 3,20 - dione, and 21 - chloro - 16 - methylene - 19 - nor - $\Delta^4$ - pregnen - 17$\alpha$ - ol - 3,20 dione, respectively, was obtained.

EXAMPLE VII

One gram of p-toluenesulfonic acid monohydrate, 50 cc. of acetic acid and 25 cc. of acetic anhydride were added to 1 gram of 16 - methylene - $\Delta^4$ - pregnen - 17$\alpha$-ol-3,20-dione, and this reaction mixture was then allowed to stand at room temperature for 24 hours. Following this reaction period the reaction mixture was poured into water and stirred to hydrolyze excess acetic anhydride, then extracted with methylene dichloride. The thus-obtained extract was washed with an aqueous 5% sodium bicarbonate solution and then with water until neutral, then evaporated to dryness under reduced pressure. Recrystallization from acetone/diethyl ether gave 16-methylene-$\Delta^{3,5}$ - pregnadiene - 3,17$\alpha$ - diol - 20 - one 3,17 - diacetate.

The thus-obtained enol acetate was dissolved in a mixture of 15 cc. of methanol and 3 cc. of tetrahydrofuran, cooled to 0° C., and then admixed with 5 cc. of a 2% methanolic potassium hydroxide solution which had previously been cooled to 0° C. The resulting reaction mixture was held at 0° C. for 1 hour, then poured into water and neutralized with dilute hydrochloric acid. Next, the neutral solution was extracted with diethyl ether, and the thus-obtained amorphous product was chromatographed on ethyl acetate-washed alumina. The hexane/benzene (1:3, respectively, by volume) eluates gave a product which was recrystallized from acetone/hexane, thus giving 16 - methylene - $\Delta^4$ - pregnen - 17$\alpha$ - ol - 3,20-dione 17-acetate.

By repeating this procedure using mixtures of propionic acid and propionic anhydride, caproic acid and caproic anhydride, and enanthic acid and enanthic anhydride, respectively, in place of acetic acid and acetic anhydride, the corresponding 17-propionate, -caproate and -enanthate were obtained.

Similarly, by repeating this procedure using the remaining 16-methylene-17$\alpha$-hydroxy steroids prepared as described in Example VI hereinabove as the steroid starting materials, the corresponding 17-acetates were obtained.

EXAMPLE VIII

To a solution of 1 gram of 16$\beta$-methyl-16$\alpha$,17$\alpha$-oxido-$\Delta^4$-pregnene-3,20-dione in 10 ml. of benzene there were added, with stirring, 5 ml. of acetic anhydride and 0.1 gram of p-toluenesulfonic acid. The resulting reaction mixture was heated to 100° C. and maintained at that temperature for 15 minutes, with continuous stirring, following which it was cooled, poured into water and stirred to hydrolyze excess acetic anhydride and precipitate the product. The precipitate was collected by filtration, washed with water, dried and then crystallized from aqueous methanol containing a trace of pyridine, thus giving 16 - methylene - $\Delta^{3,5}$-pregnadien-3,17$\alpha$-diol-20-one 3,17-diacetate, identical to the first product prepared as described in Example VII hereinabove.

EXAMPLE IX

A solution of 2.5 grams of $\Delta^{5,16}$-pregnadien-3$\beta$-ol-20-one in 100 cc. of chloroform was cooled to 0° C. and admixed with a solution of 1.1 molar equivalents of monoperphthalic acid in 100 cc. of diethyl ether, and the resulting reaction mixture was then allowed to stand at room temperature for 20 hours. Following this reaction period the reaction mixture was diluted with water and the organic layer was separated, washed with an aqueous 5% sodium bicarbonate solution and then with water until neutral, then dried over anhydrous sodium sulfate and evaporated to dryness. Crystallization of the resulting residue from acetone/hexane gave 5$\alpha$,6$\alpha$-oxido-$\Delta^{16}$-pregnen-3$\beta$-ol-20-one.

By repeating this procedure using 19-nor-$\Delta^{5,16}$-pregnadien-3$\beta$-ol-20-one as the steroid starting material, 19-nor-5$\alpha$,6$\alpha$-oxido-$\Delta^{16}$-pregnen-3$\beta$-ol-20-one was obtained.

EXAMPLE X

A mixture of 1 gram of 5$\alpha$,6$\alpha$-oxido-$\Delta^{16}$-pregnen-3$\beta$-ol-20-one, 25 cc. of anhydrous benzene, 5 cc. of ethylene glycol and 50 mg. of p-toluenesulfonic acid monohydrate was refluxed for 16 hours, using a water separator to remove the water formed during the reaction. Following this reaction period the reaction mixture was washed with an aqueous 5% sodium bicarbonate solution and then with water, then dried over anhydrous sodium sulfate and evaporated to dryness under reduced pressure. Recrystallization from acetone/hexane gave 20-cycloethylenedioxy-5$\alpha$,6$\alpha$-oxido-$\Delta^{16}$-pregnene-3$\beta$-ol.

By repeating this procedure using 19-nor-5$\alpha$,6$\alpha$-oxido-$\Delta^{16}$-pregnen-3$\beta$-ol-20-one as the steroid starting material, 20 - cycloethylenedioxy-19-nor-5$\alpha$,6$\alpha$-oxido-$\Delta^{16}$-pregnen-3$\beta$-ol was obtained.

EXAMPLE XI

A solution of 5 grams of 20-cycloethylenedioxy-5$\alpha$,6$\alpha$-oxido-$\Delta^{16}$-pregnen-3$\beta$-ol in 200 cc. of tetrahydrofuran was cooled to 0° C. and then treated with 1.5 molar equivalents of methylmagnesium bromide dissolved in 100 cc. of diethyl ether. The resulting reaction mixture was refluxed for 2 hours, then cooled to room temperature. Next, water was added to the reaction mixture and the product was isolated by extraction with diethyl ether. The thus-obtained extract was admixed with 100 cc. of an aqueous methanolic 2% sodium hydroxide solution, following which it was washed with water until neutral, dried over anhydrous sodium sulfate and evaporated to dryness. Recrystallization from methylene dichloride/hexane gave 20-cycloethylenedioxy - 6$\beta$ - methyl-$\Delta^{16}$-pregnene-3$\beta$,5$\alpha$-diol.

By repeating this procedure using 20-cycloethylenedioxy-19-nor-5$\alpha$,6$\alpha$-oxido-$\Delta^{16}$-pregnen-3$\beta$-ol as the steroid starting material, 20 - cycloethylenedioxy - 6$\beta$ - methyl-19-nor-$\Delta^{16}$-pregnene-3$\beta$,5$\alpha$-diol was obtained.

EXAMPLE XII

Five cc. of freshly distilled boron trifluoride etherate were added to a solution of 5 grams of 20-cycloethylenedioxy-5$\alpha$,6$\alpha$-oxido-$\Delta^{16}$-pregnen-3$\beta$-ol in a mixture of 250 cc. of diethyl ether and 250 cc. of benzene, and the resulting reaction mixture was allowed to stand at room temperature overnight. Following this reaction period water was added to the reaction mixture and the organic layer was separated, washed with water until neutral, dried over anhydrous sodium sulfate and evaporated to dryness under reduced pressure. Recrystallization of the resulting residue from methylene dichloride/hexane gave 20-cycloethylenedioxy-6$\beta$-fluoro-$\Delta^{16}$-pregnene-3$\beta$,5$\alpha$-diol.

By repeating this procedure using 20-cycloethylenedioxy-19-nor-5$\alpha$,6$\alpha$-oxido-$\Delta^{16}$-pregnen-3$\beta$-ol as the steroid starting material, 20-cycloethylenedioxy-6$\beta$-fluoro-19-nor-$\Delta^{16}$-pregnene-3$\beta$,5$\alpha$-diol was obtained.

EXAMPLE XIII

Thirty cc. of a 0.45 N solution of dry hydrogen chloride in chloroform were added, with stirring, over a 35 minute period, to a solution of 4 grams of 20-cycloethylenedioxy-5$\alpha$,6$\alpha$-oxido-$\Delta^{16}$-pregnen-3$\beta$-ol-20-one in 40 cc. of chloroform, the temperature of the reaction mixture being maintained at about 0° C. during this addition. Following the addition of the last of the hydrogen chloride solution the reaction mixture was stirred at 0° C. for one hour more, then diluted with water. The chloroform layer was separated, washed with an aqueous 5% sodium bicarbonate solution and then with water until neutral, then dried over anhydrous sodium sulfate and evaporated to dryness under reduced pressure. Crystallization of the resulting residue from acetone/hexane gave 6$\beta$ - chloro - 20 - cycloethylenedioxy - $\Delta^{16}$ - pregnene-3$\beta$,5$\alpha$-diol.

By repeating this procedure using 19-nor-5$\alpha$,6$\alpha$-oxido-$\Delta^{16}$-pregnen-3$\beta$-ol as the steroid starting material, 6$\beta$-chloro - 20 - cycloethylenedioxy - 19 - nor - $\Delta^{16}$ - pregnene-3$\beta$,5$\alpha$-diol was obtained.

EXAMPLE XIV

A solution of 2 grams of 20-cycloethylenedioxy-6$\beta$-methyl-$\Delta^{16}$-pregnene-3$\beta$,5$\alpha$-diol in 70 cc. of methanol was admixed with 7 cc. of aqueous 8% sulfuric acid, and the resulting reaction mixture was refluxed for 40 minutes. Following this reaction period the reaction mixture was neutralized by the addition of a saturated sodium carbonate solution, then concentrated under reduced pressure to a volume of about 20 cc. and poured into water. The thus-formed precipitate was collected by filtration, washed with water and dried. Recrystallization from acetone gave 6$\beta$-methyl-$\Delta^{16}$-pregnene-3$\beta$,5$\alpha$-diol-20-one.

By repeating this procedure using 20-cycloethylenedioxy-6$\beta$-fluoro-$\Delta^{16}$-pregnene-3$\beta$,5$\alpha$-diol,
6$\beta$-chloro-20-cycloethylenedioxy-$\Delta^{16}$-pregnene-3$\beta$,5$\alpha$-diol,
20-cycloethylenedioxy-6$\beta$-methyl-19-nor-$\Delta^{16}$-pregnene-3$\beta$,5$\alpha$-diol,
20-cycloethylenedioxy-6$\beta$-fluoro-19-nor-$\Delta^{16}$-pregnene-3$\beta$,5$\alpha$-diol, and
6$\beta$-chloro-20-cycloethylenedioxy-19-nor-$\Delta^{16}$-pregnene-3$\beta$,5$\alpha$-diol, respectively, as the steroid starting material, the corresponding 20-keto steroids, namely, 6$\beta$-fluoro-$\Delta^{16}$-pregnene-3$\beta$,5$\alpha$-diol-20-one,
6$\beta$-chloro-$\Delta^{16}$-pregnene-3$\beta$,5$\alpha$-diol-20-one,
6$\beta$-methyl-19-nor-$\Delta^{16}$-pregnene-3$\beta$,5$\alpha$-diol-20-one,
6$\beta$-fluoro-19-nor-$\Delta^{16}$-pregnene-3$\beta$,5$\alpha$-diol-20-one, and
6$\beta$-chloro-19-nor-$\Delta^{16}$-pregnene-3$\beta$,5$\alpha$-diol-20-one, respectively, were obtained.

EXAMPLE XV

The procedure of Example II hereinabove was repeated using the 20-keto steroids prepared as described in Example XIV hereinabove as the steroid starting material. In each case, the corresponding 16-methyl-$\Delta^{16}$-steroid, namely, 6$\beta$,16-dimethyl-$\Delta^{16}$-pregnene-3$\beta$,5$\alpha$-diol-20-one,
6$\beta$-fluoro-16-methyl-$\Delta^{16}$-pregnene-3$\beta$,5$\alpha$-diol-20-one,
6$\beta$-chloro-16-methyl-$\Delta^{16}$-pregnene-3$\beta$,5$\alpha$-diol-20-one,
6$\beta$,16-dimethyl-19-nor-$\Delta^{16}$-pregnene-3$\beta$,5$\alpha$-diol-20-one,
6$\beta$-fluoro-16-methyl-19-nor-$\Delta^{16}$-pregnene-3$\beta$,5$\alpha$-diol-20-one, and
6$\beta$-chloro-16-methyl-19-nor-$\Delta^{16}$-pregnene-3$\beta$,5$\alpha$-diol-20-one, respectively, was obtained.

EXAMPLE XVI

The 16(17)-double bond in the 16-methyl-$\Delta^{16}$-steroids prepared as described in Example XV hereinabove was epoxidized in the manner described in Example III hereinabove, thus giving 6β,16β-dimethyl-16α,17α-oxidopregnane-3β,5α-diol-20-one,
6β-fluoro-16β-methyl-16α,17α-oxidopregnane-3β,5α-diol-20-one,
6β-chloro-16β-methyl-16α,17α-oxidopregnane-3β,5α-diol-20-one,
6β,16β-dimethyl-19-nor-16α,17α-oxidopregnane-3β,5α-diol-20-one,
6β-fluoro-16β-methyl-19-nor-16α,17α-oxidopregnane-3β,5α-diol-20-one, and
6β-chloro-16β-methyl-19-nor-16α,17α-oxidopregnane-3β,5α-diol-20-one, respectively.

EXAMPLE XVII

The 16α,17α-oxido steroids prepared as described in Example XVI hereinabove were treated in the manner described in Example IV hereinabove to give first the corresponding 21-iodo steroids, namely, 6β,16β-dimethyl-21-iodo-16α,17α-oxidopregnane-3β,5α-diol-20-one,
6β-fluoro-21-iodo-16β-methyl-16α,17α-oxidopregnane-3β,5α-diol-20-one,
6β-chloro-21-iodo-16β-methyl-16α,17α-oxidopregnane-3β,5α-diol-20-one,
6β,16β-dimethyl-21-iodo-19-nor-16α,17α-oxido-pregnane-3β,5α-diol-20-one,
6β-fluoro-21-iodo-16β-methyl-19-nor-16α,17α-oxidopregnane-3β,5α-diol-20-one, and
6β-chloro-21-iodo-16β-methyl-19-nor-16α,17α-oxidopregnane-3β,5α-diol-20-one, respectively, and then the corresponding 21-fluorosteroids, namely, 6β,16β-dimethyl-21-fluoro-16α,17α-oxidopregnane-3β,5α-diol-20-one,
6β,21-difluoro-16β-methyl-16α,17α-oxidopregnane-3β,5α-diol-20-one,
6β-chloro-21-fluoro-16β-methyl-16α,17α-oxidopregnane-3β,5α-diol-20-one,
6β,16β-dimethyl-21-fluoro-19-nor-16α,17α-oxidopregnane-3β,5α-diol-20-one,
6β,21-difluoro-16β-methyl-19-nor-16α,17α-oxidopregnane-3β,5α-diol-20-one, and
6β-chloro-21-fluoro-16β-methyl-19-nor-16α,17α-oxidopregnane-3β,5α-diol-20-one, respectively.

EXAMPLE XVIII

The 21-iodo steroids prepared as described in Example XVII hereinabove were treated in the manner described in Example V hereinabove, thus giving the corresponding 21-chloro steroids, namely, 21-chloro-6β,16β-dimethyl-16α,17α-oxidopregnane-3β,5α-diol-20-one,
21-chloro-6β-fluoro-16β-methyl-16α,17α-oxidopregnane-3β,5α-diol-20-one,
6β,21-difluoro-16-methylene-19-norpregnane-3β,5α-triol-20-one,
21-chloro-6β,16β-dimethyl-19-nor-16α,17α-oxidopregnane-3β,5α-diol-20-one,
21-chloro-6β-fluoro-16β-methyl-19-nor-16α,17α-oxidopregnane-3β,5α-diol-20-one, and
6β,21-dichloro-16β-methyl-19-nor-16α,17α-oxidopregnane-3β,5α-diol-20-one, respectively.

EXAMPLE XIX

The 16α,17α-oxidopregnanes prepared as described in Examples XVI, XVII and XVIII hereinabove were cleaved with trifluoroacetic acid in benzene in the presence of p-toluenesulfonic acid in the manner described in Example VI hereinabove, thus giving the corresponding 16-methylene-17α-ols, namely, 16-methylene-6β-methylpregnane-3β,5α,17α-triol-20-one,
6β-fluoro-16-methylenepregnane-3β,5α,17α-triol-20-one,
6β-chloro-16-methylenepregnane-3β,5α,17α-triol-20-one,
16-methylene-6β-methyl-19-norpregnane-3β,5α,17α-triol-20-one,
6β-fluoro-16-methylene-19-norpregnane-3β,5α,17α-triol-20-one,
6β-chloro-16-methylene-19-norpregnane-3β,5α,17α-triol-20-one,
21-fluoro-16-methylene-6β-methylpregnane-3β,5α,17α-triol-20-one,
6β,21-difluoro-16-methylenepregnane-3β,5α,17α-triol-20-one,
6β-chloro-21-fluoro-16-methylenepregnane-3β,5α,17α-triol-20-one,
21-fluoro-16-methylene-6β-methyl-19-norpregnane-3β,5α,17α-triol-20-one,
6β,21-difluoro-16-methylene-19-norpregnane-3β,5α,17α-triol-20-one,
6β-chloro-21-fluoro-16-methylene-19-norpregnane-3β,5α-17α-triol-20-one,
21-chloro-16-methylene-6β-methylpregnane-3β,5α,17α-triol-20-one,
21-chloro-6β-fluoro-16-methylenepregnane-3β,5α,17α-triol-20-one,
6β,21-dichloro,16-methylenepregnane-3β,5α,17α-triol-20-one,
6β-methyl-21-chloro-16-methylene-19-norpregnane-3β,5α,17α-triol-20-one,
21-chloro-6β-fluoro,16-methylene-19-norpregnane-3β,5α,17α-triol-20-one, and
6β,21-dichloro-16-methylene-19-norpregnane-3β,5α,17α-triol-20-one, respectively.

EXAMPLE XX

A solution of 1 gram of 16-methylene-6β-methylpregnane-3β,5α,17α-triol-20-one in 10 cc. of acetone was cooled to 0° C. and then admixed under an inert nitrogen atmosphere, with stirring, with an 8 N chromic acid solution (prepared by mixing 26 grams of chromium trioxide with 23 cc. of concentrated sulfuric acid and diluting with water to give 100 cc. of solution), the acid solution being added until its color persisted in the reaction mixture. Following this addition the reaction mixture was stirred for an additional 5 minutes at 0–5° C., then diluted with water. The resulting precipitate was collected by filtration, washed with water and dried under reduced pressure. Recrystallization from acetone/hexane gave 16-methylene-6α-methyl-Δ⁴-pregnen-17α-ol-3,20-dione.

By repeating this procedure using the remaining 16-methylene-17α-ols prepared as described in Example XIX hereinabove, the corresponding 6α-substituted-Δ⁴-3-ones, namely, 6α-fluoro-16-methylene-Δ⁴-pregnen17α-ol-3,20-dione,
6α-chloro-16-methylene-Δ⁴-pregnen-17α-ol-3,20-dione,
16-methylene-6α-methyl-19-nor-Δ⁴-pregnen 17α-ol-3,20-dione,
6α-fluoro-16-methylene-19-nor-Δ⁴-pregnen-17α-ol-3,20-dione,
6α-chloro-16-methylene-19-nor-Δ⁴-pregnen-17α-ol-3,20-dione,
21-fluoro-16-methylene-6α-methyl-Δ⁴-pregnen-17α-ol-3,20-dione,
6α,21-difluoro-16-methylene-Δ⁴-pregnen-17α-ol-3,20-dione,
6α-chloro-21-fluoro-16-methylene-Δ⁴-pregnen-17α-ol-3,20-dione, 21-fluoro-16-methylene-6α-methyl-19-nor-Δ²-pregnen-
17α-ol-3,20-dione,
6α,21-difluoro-16-methylene-19-nor-Δ⁴-pregnen-
17α-ol-3,20-dione,
6α-chloro-21-fluoro-16-methylene-19-nor-Δ⁴-
pregnen-17α-ol-3,20-dione,
21-fluoro-16-methylene-6α-methyl-19-nor-Δ⁴-pregnen-
17α-ol-3,20-dione,
21-chloro-6α-fluoro-16-methylene-Δ⁴-pregnen-
17α-ol-3,20-dione,
6α,21-dichloro-16-methylene-Δ⁴-pregnen-
17α-ol-3,20-dione,
21-chloro-16-methylene-6α-methyl-19-nor-Δ⁴-
pregnen-17α-ol-3,20-dione,
21-chloro-6α-fluoro-16-methylene-19-nor-Δ⁴-
pregnen-17α-ol-3,20-dione, and
6α,21-dichloro-16-methylene-19-nor-Δ⁴-
pregnen-17α-ol-3,20-dione, respectively, were obtained.

EXAMPLE XXI

The 6α-substituted-Δ⁴-3-ones prepared as described in Example XX hereinabove were treated with a mixture of acetic acid and acetic anhydride in the presence of p-toluenesulfonic acid, and then with methanolic potassium hydroxide, in the manner described in Example VII hereinabove, thus giving the corresponding 17-acetates.

EXAMPLE XXII

A solution of 1 gram of 16-methylene-Δ⁴-pregnen-17α-ol-3,20-dione 17-acetate in 5 cc. of glacial acetic acid containing 1 cc. of ethanidithiol was admixed with 1 cc. of boron trifluoride etherate, and the resulting reaction mixture was allowed to stand at room temperature for 1 hour. Following this reaction period the reaction mixture was cooled in ice to complete the precipitation of the dithioketal, then filtered. The filtered precipitate was washed with methanol until the washings were free of the odor of ethanedithiol, then recrystallized from chloroform/methanol to give 3-cycloethylenedithio-6-methylene-Δ⁴-pregnen-17α-ol-20-one 17-acetate.

A solution of 1 gram of the thus-prepared 3-dithioketal in a mixture of 50 cc. of ethanol and 50 cc. of dioxane (the solvents having been distilled from Raney nickel) was admixed with 20 grams of freshly prepared Raney nickel, and the resulting reaction mixture was then refluxed for 4 hours. Following this reaction period the reaction mixture was cooled to room temperature and then filtered to remove the Raney nickel, which was then washed with hot ethanol and the washings added to the filtrate. The filtrate was then evaporated to dryness under reduced pressure, and the resulting residue was dissolved in chloroform. This solution was washed with a dilute, aqueous hydrochloric acid solution, then with an aqueous 10% sodium carbonate solution and finally with water until neutral, then dried over anhydrous sodium sulfate and evaporated to dryness under reduced pressure. Recrystallization of the resulting residue from acetone/hexane gave 16-methylene-Δ⁴-pregnen-17α-ol-20-one 17-acetate.

By repeating this procedure using the 17-propionate, -caproate and -enathate of 16-methylene-Δ⁴-pregnen-17α-ol-3,20-dione, prepared as described in Example VII hereinabove, as the steroid starting materials, the 17-propionate, -caproate and -enanthate of 16-methylene-Δ⁴-pregnan-17α-ol-20-one were obtained.

This procedure was again repeated using the remaining 16-methylene-17α-acetoxy-Δ⁴-3-ones prepared as described in Examples VII and XXI hereinabove as the steroid starting materials. In each case the corresponding 3-dithioketal and then the 3-desoxy steroid, namely, 21-fluoro-16-methylene-Δ⁴-pregnen-17α-ol-20-one
17-acetate,
21-chloro-16-methylene-Δ⁴-pregnen-17α-ol-20-one
17-acetate,
16-methylene-19-nor-Δ⁴-pregnen-17α-ol-20-one
17-acetate,
21-fluoro-16-methylene-19-nor-Δ⁴-pregnen-17α-ol-20-one
17-acetate,
21-chloro-16-methylene-19-nor-Δ⁴-pregnen-17α-ol-20-one
17-acetate,
16-methylene-6α-methyl-Δ⁴-pregnen-17α-ol-20-one
17-acetate,
6α-fluoro-16-methylene-Δ⁴-pregnen-17α-ol-20-one
17-acetate,
6α-chloro-16-methylene-Δ⁴-pregnen-17α-ol-20-one
17-acetate,
16-methylene-6α-methyl-19-nor-Δ⁴-pregnen-17α-ol-20-one 17-acetate,
6α-fluoro-16-methylene-19-nor-Δ⁴-pregnen-17α-ol-20-one
17-acetate,
6α-chloro-16-methylene-19-nor-Δ⁴-pregnen-17α-ol-20-one
17-acetate,
21-fluoro-16-methylene-6α-methyl-Δ⁴-pregnen-17α-ol-20-one 17-acetate,
6α,21-difluoro-16-methylene-Δ⁴-pregnen-17α-ol-20-one
17-acetate,
6α-chloro-21-fluoro-16-methylene-Δ⁴-pregnen-17α-ol-20-one 17-acetate,
21-fluoro-16-methylene-6α-methyl-19-nor-Δ⁴-pregnen-
17α-ol-20-one 17-acetate,
6α,21-difluoro-16-methylene-19-nor-Δ⁴-pregnen-17α-ol-
20-one 17-acetate,
6α-chloro-21-fluoro-16-methylene-19-nor-Δ⁴-pregnen-
17α-ol-20-one 17-acetate,
21-chloro-16-methylene-6α-methyl-Δ⁴-pregnen-17α-ol-
20-one 17-acetate,
21-chloro-6α-fluoro-16-methylene-Δ⁴-pregnen-17α-ol-20-
one 17-acetate,
6α,21-dichloro-16-methylene-Δ⁴-pregnen-17α-ol-20-one
17-acetate,
21-chloro-16-methylene-6α-methyl-19-nor-Δ⁴-pregnen-
17α-ol-20-one 17-acetate,
21-chloro-6α-fluoro-16-mythylene-19-nor-Δ⁴-pregnen-
17α-ol-20-one 17-acetate, and
6α,21-dichloro-16-methylene-19-nor-Δ⁴-pregnen-17α-
ol-20-one 17-acetate, respectively, was obtained.

Similarly, by again repeating this procedure using the 16-methylene-17α-hydroxy-Δ⁴-3-ones prepared as described in Examples VI and XX hereinabove as the steroid starting materials, the corresponding free 17α-hydroxy-3-dithioketals and then the free 17α-hydroxy-3-desoxy steroids corresponding to the above-listed 17-acetates were prepared.

EXAMPLE XXIII

A solution of 0.17 gram of potassium hydroxide in 0.2 cc. of water and 2.5 cc. of methanol was added over a 30 minute period to a boiling solution of 1 gram of 16-methylene-Δ⁴-pregnen-17α-ol-20-one 17-acetate in 30 cc. of methanol, maintained under an inert nitrogen atmosphere, and the resulting reaction mixture was boiled for 2 hours more following this addition. Next, the reaction mixture was cooled, neutralized with acetic acid and then concentrated under reduced pressure. The thus-obtained concentrate was then diluted with water, and the resulting precipitate was collected by filtration, washed with water and dried. Recrystallization from acetone/hexane gave 16-methylene-Δ⁴-pregnen-17α-ol-20-one.

By repeating this procedure using the remaining 3-desoxy-17α-acetoxy steroids prepared as described in Example XXII hereinabove as the steroid starting materials, the corresponding 3-desoxy-17α-hydroxy steroids, identical to those prepared from the corresponding 16-methylene-17α-hydroxy-3-ones, were obtained.

EXAMPLE XXIV

A mixture of 1 gram of 16-methylene-$\Delta^4$-pregnen-17α-ol-3,20-dione 17-acetate, 2 grams of chloranil and 50 cc. of t-butanol was refluxed for 8 hours. Following this reaction period the reaction mixture was cooled, unreacted chloranil was removed therefrom by filtration and washed several times with ethyl acetate, and these washings were then added to the filtrate. The combined organic solution (filtrate plus washings) was washed with a cold, aqueous 10% sodium hydroxide solution until the washings were colorless, and the organic layer (chiefly ethyl acetate, containing the product) was dried over anhydrous sodium sulfate and evaporated to dryness under reduced pressure. The resulting dry residue was dissolved in methylene dichloride/diethyl ether, decolorized with alumina, and then crystallized to give 16-methylene-$\Delta^{4,6}$-pregnadien-17α-ol-3,20-dione 17-acetate.

By repeating this procedure using the remaining 16-methylene-17α-acetoxy-$\Delta^4$-3-ones prepared as described in Examples VII and XXI hereinabove, the corresponding 6-dehydro steroids were obtained.

EXAMPLE XXV

The procedure of Example XXII hereinabove was repeated using the 6-dehydro steroids prepared as described in Example XXIV hereinabove. In each case, the corresponding 3-desoxy-$\Delta^{4,6}$-17α-acetoxy steroid, namely, 16-methylene-$\Delta^{4,6}$-pregnadien-17α-ol-20-one 17-acetate,
21-fluoro-16-methylene-$\Delta^{4,6}$-pregnadien-17α-ol-20-one 17-acetate,
21-chloro-16-methylene-$\Delta^{4,6}$-pregnadien-17α-ol-20-one 17-acetate,
16-methylene-19-nor-$\Delta^{4,6}$-pregnadien-17α-ol-20-one 17-acetate,
21-fluoro-16-methylene-19-nor-$\Delta^{4,6}$-pregnadien-17α-ol-20-one 17-acetate,
21-chloro-16-methylene-19-nor-$\Delta^{4,6}$-pregnadien-17α-ol-20-one 17-acetate,
16-methylene-6-methyl-$\Delta^{4,6}$-pregnadien-17α-ol-20-one 17-acetate,
6-fluoro-16-methylene-$\Delta^{4,6}$-pregnadien-17α-ol-20-one 17-acetate,
6-chloro-16-methylene-$\Delta^{4,6}$-pregnadien-17α-ol-20-one 17-acetate,
16-methylene-6-methyl-19-nor-$\Delta^{4,6}$-pregnadien-17α-ol-20-one 17-acetate,
6-fluoro-16-methylene-19-nor-$\Delta^{4,6}$-pregnadien-17α-ol-20-one 17-acetate,
6-chloro-16-methylene-19-nor-$\Delta^{4,6}$-pregnadien-17α-ol-20-one 17 acetate,
6-chloro-16-methylene-19-nor-$\Delta^{4,6}$-pregnadien-17α-ol-20-one 17 acetate,
6,21-difluoro-16-methylene-$\Delta^{4,6}$-pregnadien-17α-ol-20-one 17-acetate,
6-chloro-21-fluoro-16-methylene-$\Delta^{4,6}$-pregnadien-17α-ol-20-one 17-acetate,
21-fluoro-16-methylene-6-methyl-19-nor-$\Delta^{4,6}$-pregnadien-17α-ol-20-one 17-acetate,
6,21-difluoro-16-methylene-19-nor-$\Delta^{4,6}$-pregnadien-17α-ol-20-one 17-acetate,
6-chloro-21-fluoro-16-methylene-19-nor-$\Delta^{4,6}$-pregnadien-17α-ol-20-one 17-acetate,
21-chloro-16-methylene-6-methyl-$\Delta^{4,6}$-pregnadien-17α-ol-20-one 17-acetate,
21-chloro-6-fluoro-16-methylene-$\Delta^{4,6}$-pregnadien-17α-ol-20-one 17-acetate,
6,21-dichloro-16-methylene-$\Delta^{4,6}$-pregnadien-17α-ol-20-one 17-acetate,
21-chloro-16-methylene-6-methyl-19-nor-$\Delta^{4,6}$-pregnadien-17α-ol-20-one 17-acetate,
21-chloro-6-fluoro-16-methylene-19-nor-$\Delta^{4,6}$-pregnadien-17α-ol-20-one 17-acetate, and
6,21-dichloro-16-methylene-19-nor-$\Delta^{4,6}$-pregnadien-17α-ol-20-one 17 acetate, respectively, was obtained.

EXAMPLE XXVI

The procedure of Example XXIII hereinabove was repeated using the 3-desoxy-$\Delta^{4,6}$-17α-acetoxy steroids prepared as described in Example XXV hereinabove as the steroid starting materials. In each case, the corresponding 3-desoxy-$\Delta^{4,6}$-17α-hydroxy steroid was obtained.

EXAMPLE XXVII

The procedure of Example VII hereinabove was repeated using the 3-desoxy-$\Delta^4$-17α-ols and 3-desoxy-$\Delta^{4,6}$-17α-ols prepared as described in Examples XXII and XXVI, respectively, as the steroid starting materials and mixtures of propionic acid and propionic anhydride, caproic acid and caproic anhydride, and enanthic acid and enanthic anhydride, respectively, as the acylating agents. In each case, the corresponding 17-propionate, -caproate and -enanthate was obtained.

EXAMPLE XXVIII

The 6-unsubstituted-$\Delta^{4,6}$-3-ones prepared as described in Example XXIV hereinabove were epoxidized in the manner described in Example IX hereinabove, thus giving the corresponding 6α,7α-oxido steroids, namely, 16-methylene-6α,7α-oxido-$\Delta^4$-pregnen-17α-ol-3,20-dione 17-acetate,
21-fluoro-16-methylene-6α,7α-oxido-$\Delta^4$-pregnen-17α-ol-3,20-dione 17-acetate,
21-chloro-16-methylene-6α,7α-oxido-$\Delta^4$-pregnen-17α-ol-3,20-dione 17-acetate,
16-methylene-19-nor-6α,7α-oxido-$\Delta^4$-pregnen-17α-ol-3,20-dione 17-acetate,
21-fluoro-16-methylene-19-nor-6α,7α-oxido-$\Delta^4$-pregnen-17α-ol-3,20-dione 17-acetate, and
21-chloro-16-methylene-19-nor-6α,7α-oxido-$\Delta^4$-pregnen-17α-ol-3,20-dione 17-acetate, respectively.

EXAMPLE XXIX

The 6α,7α-oxido steroids prepared as described in Example XXVIII hereinabove were reacted with boron trifluoride in a mixture of diethyl ether and benzene in the manner described in Example XII hereinabove, thus giving the corresponding 6β-fluoro-7α-hydroxy steroids, namely, 6β-fluoro-16-methylene-$\Delta^4$-pregnen-7α,17α-diol-3,20-dione 17-acetate,
6β,21-difluoro-16-methylene-$\Delta^4$-pregnene-7α,17α-diol-3,20-dione 17-acetate,
21-chloro-6β-fluoro-16-methylene-$\Delta^4$-pregnene-7α,17α-diol-3,20-dione 17-acetate,
6β-fluoro-16-methylene-19-nor-$\Delta^4$-pregnene-7α,17α-diol-3,20-dione 17-acetate,
6β,21-difluoro-16-methylene-19-nor-$\Delta^4$-pregnene-7α,17α-diol-3,20-dione 17-acetate, and
21-chloro-6β-fluoro-16-methylene-19-nor-$\Delta^4$-pregnene-7α,17α-diol-3,20-dione 17-acetate, respectively.

EXAMPLE XXX

One gram of 6β-fluoro-16-methylene-$\Delta^4$-pregnene-7α,17α-diol-3,20-dione 17-acetate was suspended in 35 cc. of glacial acetic acid, and a slow current of anhydrous hydrogen chloride gas was passed through this suspension for 5 hours. Following this reaction period the reaction mixture was concentrated to about one-third of its initial volume by distillation under reduced pressure at 35° C., and then poured into ice water. The resulting precipitate was collected by filtration, washed with water until neutral, and then dried. Recrystallization from methylene dichloride/hexane gave 6-fluoro-16-methylene-$\Delta^{4,6}$-pregnadien-17α-ol-3,20-dione 17-acetate, identical to that prepared as described in Example XXIV hereinabove.

By repeating this procedure using the remaining 6β-fluoro-7α-hydroxy steroids prepared as described in Example XXIX hereinabove as the steroid starting materials, the corresponding 6-fluoro-6-dehydro steroids, namely, 6,21-difluoro-16-methylene-Δ⁴,⁶-pregnadien-17α-ol-3,20-dione 17-acetate,
21-chloro-6-fluoro-16-methylene-Δ⁴,⁶-pregnadien-17α-ol-3,20-dione 17-acetate,
6-fluoro-16-methylene-19-nor-Δ⁴,⁶-pregnadien-17α-ol-3,20-dione 17-acetate,
6,21-difluoro-16-methylene-19-nor-Δ⁴,⁶-pregnadien-17α-ol-3,20-dione 17-acetate, and
21-chloro-6-fluoro-16-methylene-19-nor-Δ⁴,⁶-pregnadien-17α-ol-3,20-dione 17-acetate, respectively, identical to those prepared as described in Example XXIV hereinabove, were obtained.

This procedure was again repeated using the 6α,7α-oxido steroids prepared as described in Example XXVIII hereinabove as the steroid starting materials. In each case, the corresponding 6-chloro-6-dehydro steroid, namely, 6-chloro-16-methylene-Δ⁴,⁶-pregnadien-17α-ol-3,20-dione 17-acetate,
6-chloro-21-fluoro-16-methylene-Δ⁴,⁶-pregnadien-17α-ol-3,20-dione 17-acetate,
6,21-dichloro-16-methylene-Δ⁴,⁶-pregnadien-17α-ol-3,20-dione 17-acetate,
6-chloro-16-methylene-19-nor-Δ⁴,⁶-pregnadien-17α-ol-3,20-dione 17-acetate,
6-chloro-21-fluoro-16-methylene-19-nor-Δ⁴,⁶-pregnadien-17α-ol-3,20-dione 17-acetate, and
6,21-dichloro-16-methylene-19-nor-Δ⁴,⁶-pregnadien-17α-ol-3,20-dione 17-acetate, respectively, identical to that prepared as described in Example XXIV hereinabove, was obtained.

It will be obvious to those skilled in the art that other changes and variations can be made in carrying out the present invention without departing from the spirit and scope thereof as defined in the appended claims.

I claim:
1. A compound represented by the general formula:

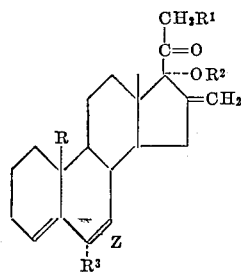

wherein R is selected from the group consisting of hydrogen and methyl, R' is selected from the group consisting of hydrogen, fluorine and chlorine, R² is selected from the group consisting of hydrogen and a hydrocarbon carboxylic acyl group containing less than 12 carbon atoms, R³ is selected from the group consisting of hydrogen, methyl, fluorine and chlorine, and Z is selected from the group consisting of a double bond and a saturated linkage between the carbon atoms at the 6- and 7-positions.

2. 16-methylene-Δ⁴-pregnen-17α-ol-20-one.
3. 16-methylene-19-nor-Δ⁴-pregnen-17α-ol-20-one.
4. 16-methylene-6α-methyl-Δ⁴-pregnen-17α-ol-20-one.
5. A hydrocarbon carboxylic acid ester of less than 12 carbon atoms of 16-methylene-6α-methyl-Δ⁴-pregnen-17α-ol-20-one.
6. 16-methylene-6α-methyl - 19-nor-Δ⁴-pregnen - 17α-ol-20-one.
7. 6α-halo - 16-methylene-Δ⁴-pregnen - 17α-ol-20-one wherein the halogen has an atomic number less than 35.
8. A hydrocarbon carboxylic acid ester of less than 12 carbon atoms of 6α-halo-16-methylene-Δ⁴-pregnen-17α-ol-20-one wherein the halogen has an atomic number less than 35.
9. 6α-halo-16-methylene-19-nor-Δ⁴-pregnen - 17α-ol-20-one wherein the halogen has an atomic number less than 35.
10. 16-methylene-Δ⁴,⁶-pregnadien-17α-ol-20-one.
11. 16-methylene-19-nor-Δ⁴,⁶-pregnadien-17α-ol-20-one.
12. 16-methylene-6-methyl-Δ⁴,⁶-pregnadien - 17α-ol-20-one.
13. A hydrocarbon carboxylic acid ester of less than 12 carbon atoms of 16-methylene-6-methyl-Δ⁴,⁶-pregnadien-17α-ol-20-one.
14. 16-methylene-6-methyl-19-nor-Δ⁴,⁶-pregnadien-17α-ol-20-one.
15. 6-halo-16-methylene-Δ⁴,⁶ - pregnadien - 17α-ol-20-one wherein the halogen has an atomic number less than 35.
16. A hydrocarbon carboxylic acid ester of less than 12 carbon atoms of 6-halo-16-methylene-Δ⁴,⁶-pregnadien-17α-ol-20-one wherein the halogen has an atomic number less than 35.
17. 6-halo-16-methylene - 19-nor-Δ⁴,⁶-pregnadien-17α-ol-20-one wherein the halogen has an atomic number less than 35.
18. 21-halo - 16-methylene-Δ⁴-pregnen - 17α-ol-20-one wherein the halogen has an atomic number less than 35.
19. 21-halo-16-methylene-Δ⁴,⁶-pregnadiene - 17α-ol-20-one wherein the halogen has an atomic number less than 35.
20. 6α,21-dihalo - 16-methylene-Δ⁴-pregnen-17α-ol-20-one wherein the halogen has an atomic number less than 35.
21. 6,21-dihalo - 16-methylene-Δ⁴,⁶-pregnadien-17α-ol-20-one wherein the halogen has an atomic number less than 35.

References Cited by the Examiner
UNITED STATES PATENTS
3,186,985   6/1965   Robinson _____ 260—239.55

ELBERT L. ROBERTS, *Acting Primary Examiner*
T. M. MESHBESHER, *Assistant Examiner.*

UNITED STATES PATENT OFFICE
CERTIFICATE OF CORRECTION

Patent No. 3,284,476                      November 8, 1966

Fred A. Kincl

It is hereby certified that error appears in the above numbered patent requiring correction and that the said Letters Patent should read as corrected below.

Column 3, line 57, for "mixture" read -- mixtures --; column 13, line 61, for "6β,21-difluoro-16-methylene-19-norpregnane-3β,5α-triol-20-one" read -- 6β,21-dichloro-16β-methyl-16α,17α-oxidopregnane-3β,5α-diol-20-one --; column 14, line 61, for "6α-fluoro-16-methylene-$\Delta^4$-pregnen 17α-ol-3,20-dione" read -- 6α-fluoro-16-methylene-$\Delta^4$-pregnen-17α-ol-3,20-dione --; line 63, for "16-methylene-6α-methyl-19-nor-$\Delta^4$-pregnen" read -- 16-methylene-6α-methyl-19-nor-$\Delta^4$-pregnen- --; column 15, line 1, for "21-fluoro-16-methylene-6α-methyl-19-nor-$\Delta^2$-pregnen-" read -- 21-fluoro-16-methylene-6α-methyl-19-nor-$\Delta^4$-pregnen- --; line 7, for "21-fluoro-16-methylene-6α-methyl-19-nor-$\Delta^4$-pregnen-" read -- 21-chloro-16-methylene-6α-methyl-$\Delta^4$-pregnen- --; line 33, for "ethanidithiol" read -- ethanedithiol --; column 17, between lines 52 and 53, insert -- 21-fluoro-16-methylene-6-methyl-$\Delta^{4,6}$-pregnadien-17α-ol-20-one 17-acetate --.

Signed and sealed this 12th day of September 1967.

(SEAL)
Attest:

ERNEST W. SWIDER                          EDWARD J. BRENNER
Attesting Officer                     Commissioner of Patents